United States Patent
Spreha (10) Patent No.: US 9,720,674 B1
(45) Date of Patent: Aug. 1, 2017

(54) AUTOMATING APPLICATION OF SOFTWARE PATCHES TO A SERVER HAVING A VIRTUALIZATION LAYER

(75) Inventor: Craig A. Spreha, Decatur, GA (US)

(73) Assignee: Open Invention Network, LLC, Durham, NC (US)

( * ) Notice: Subject to any disclaimer, the term of this patent is extended or adjusted under 35 U.S.C. 154(b) by 1390 days.

(21) Appl. No.: 12/115,178

(22) Filed: May 5, 2008

(51) Int. Cl.
*G06F 9/445* (2006.01)
*G06F 9/44* (2006.01)
*H04L 29/06* (2006.01)

(52) U.S. Cl.
CPC .............. *G06F 8/65* (2013.01); *G06F 9/4401* (2013.01); *H04L 63/20* (2013.01)

(58) Field of Classification Search
CPC ........... H04L 63/20; G06F 8/65; G06F 9/4401
USPC .......... 717/168, 170, 174, 176, 177
See application file for complete search history.

(56) References Cited

U.S. PATENT DOCUMENTS

| | | | |
|---|---|---|---|
| 6,009,274 A | 12/1999 | Fletcher et al. | |
| 6,088,451 A * | 7/2000 | He ..................... | H04L 63/0807 380/255 |
| 6,161,218 A | 12/2000 | Taylor | |
| 6,434,744 B1 | 8/2002 | Chamberlain et al. | |
| 6,950,847 B2 | 9/2005 | Harrisville-Wolff et al. | |
| 7,146,602 B2 | 12/2006 | Frerking et al. | |
| 7,249,174 B2 | 7/2007 | Srinivasa et al. | |
| 7,752,450 B1 * | 7/2010 | Palmer ................... | G06F 21/31 713/183 |
| 2002/0069369 A1 | 6/2002 | Tremain | |
| 2003/0066065 A1 * | 4/2003 | Larkin ..................... | G06F 8/65 717/177 |
| 2003/0233571 A1 | 12/2003 | Kraus et al. | |
| 2004/0003266 A1 * | 1/2004 | Moshir ..................... | G06F 8/65 713/191 |
| 2004/0107416 A1 | 6/2004 | Buban et al. | |
| 2004/0186905 A1 | 9/2004 | Young et al. | |
| 2004/0210653 A1 | 10/2004 | Kanoor et al. | |
| 2004/0249919 A1 | 12/2004 | Mattheis | |

(Continued)

FOREIGN PATENT DOCUMENTS

| | | |
|---|---|---|
| JP | 2003099297 | 4/2003 |
| JP | 2006302312 | 11/2006 |

OTHER PUBLICATIONS

"HP Instant Support Enterprise Edition", Hewlett-Packard Development Company, LP, Rev. Jul. 2006.*

(Continued)

*Primary Examiner* — Wei Zhen
*Assistant Examiner* — Mohammed Huda
(74) *Attorney, Agent, or Firm* — Haynes and Boone, LLP (57) ABSTRACT

A method and system for automating application of software patches to a server system having a virtualization layer. A plurality of software patches are downloaded to a computer system having a first operating system. The software patches to apply to a server console operating system are then determined. The software patches are automatically copied to the server system by executing a first script file. The copied software patches are automatically decompressed by executing a second script file. The decompressed software patches are installed in a specified order by executing the second script file. The console operating system is rebooted only after all software patches are installed.

23 Claims, 4 Drawing Sheets

(56) References Cited

U.S. PATENT DOCUMENTS

| | | |
|---|---|---|
| 2005/0021470 A1* | 1/2005 | Martin .............. G06F 17/30749 705/51 |
| 2005/0086534 A1 | 4/2005 | Hindawi et al. |
| 2005/0091354 A1 | 4/2005 | Lowell et al. |
| 2005/0216906 A1* | 9/2005 | Shahindoust ........... H04L 63/20 717/171 |
| 2006/0047942 A1 | 3/2006 | Rothman et al. |
| 2006/0059265 A1* | 3/2006 | Keronen ................ H04L 29/06 709/228 |
| 2006/0075076 A1 | 4/2006 | Sinha |
| 2006/0080656 A1 | 4/2006 | Cain et al. |
| 2006/0248159 A1 | 11/2006 | Polan |
| 2006/0265630 A1 | 11/2006 | Alberti et al. |
| 2007/0067435 A1* | 3/2007 | Landis .................. G06F 9/5016 709/224 |
| 2007/0198656 A1* | 8/2007 | Mazzaferri ........... G06F 3/1415 709/218 |

OTHER PUBLICATIONS

Betts, Bryan, "VMware Gets Multi-Server Config Tool", Jul. 13, 2007.

"Installing Dell OpenManage Software in a VMware ESX Server Software Environment", May 2007, www.dell.com.

WMware ESX Server Performance on Dual-Core Dell PowerEdge 2850 Servers Dell Power Solutions, May 2006, Dell Inc.

* cited by examiner

AUTOMATING APPLICATION OF SOFTWARE PATCHES TO A SERVER HAVING A VIRTUALIZATION LAYER

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Embodiments of the present invention relates generally to maintaining computer software deployed in the information processing systems of a large corporate enterprise and, more particularly, to methods and systems for automating application of patch updates to the virtualization software installed on the servers of the enterprise.

Most security incidents with computers today are caused by flaws in software referred to as vulnerabilities. The ultimate solution to software vulnerabilities is the application of patches. Software vendors generally release patches to fix vulnerabilities in their software products. If applied correctly, the patches remove vulnerabilities from computer systems.

Virtualization software, such as VMware ESX Server, is virtual machine software used for consolidating and partitioning servers in high-performance computing environments. Virtual machine software transforms physical computers into pools of logical computing resources. Physical servers can be partitioned into secure virtual machine servers. The operating systems and applications are isolated in these multiple virtual machine servers that reside on a single piece of hardware.

System resources are allocated dynamically to any operating system based on need, providing mainframe-class capacity utilization and control of server resources. Virtualization server software enables these server resources to be remotely managed, automatically provisioned, and standardized on a uniform platform. Advanced resource management controls allow information technology (IT) administrators to guarantee service levels across the enterprise. Virtualization server software runs directly on the system hardware to provide a secure, uniform platform for deploying, managing, and remotely controlling multiple virtual machines.

SUMMARY OF THE INVENTION

Embodiments of the invention are directed to automating and reducing the time needed to apply patches to a virtualization host server, such as VMware ESX Server. ESX Server is VMware's enterprise level hardware virtualization product. It is used to run multiple virtual servers on one physical piece of hardware. ESX Server abstracts processor, memory, storage, and networking resources into multiple virtual machines. By using this technology, many low-usage servers can be consolidated onto one physical box, reducing costs of floor space, energy, and hardware. Most of the virtual machines will be running Microsoft Windows operating systems. Patching of virtualization servers, including but not limited to VMware ESX Server, is currently done manually, one patch at a time, with a reboot for each patch. Embodiments of the invention include scripts that provide a smoother, faster, more reliable method to patch virtualization servers.

In one aspect of the invention, a method, system, and computer program product are provided for automating application of software patches to a server having a virtualization layer. A plurality of software patches are downloaded to a computer system having a first operating system. The software patches to apply to a server console operating system are determined. The software patches are automatically copied to the server system by executing a first script file. The copied software patches are automatically decompressed by executing a second script file. The decompressed software patches are installed in a specified order by executing the second script file. The console operating system is rebooted only after all software patches are installed.

The system includes a plurality of components that perform the steps of the method. The computer program product includes a computer readable medium having computer instructions embedded therein, the computer readable medium implementing the method when operated on a processor.

BRIEF DESCRIPTION OF THE DRAWINGS

These and other aspects of embodiments of the invention will become apparent and more readily appreciated from the following detailed description of the embodiments of the invention taken in conjunction with the accompanying drawings, as follows.

DETAILED DESCRIPTION OF THE INVENTION

The following description is provided as an enabling teaching of embodiments of the invention, including the best, currently known embodiment. Those skilled in the relevant art will recognize that many changes can be made to the embodiments described, while still obtaining the beneficial results of the present invention. It will also be apparent that some of the desired benefits of the embodiments of the invention can be obtained by selecting some of the features of the embodiments of the invention without utilizing other features. Accordingly, those who work in the art will recognize that many modifications and adaptations to the embodiments of the invention are possible and may even be desirable in certain circumstances, and are a part of the present invention. Thus, the following description is provided as illustrative of the principles of the present invention and not in limitation thereof, since the scope of the present invention is defined by the claims.

Since embodiments of the invention are directed to a console operating system for a server having a virtualization layer, such as the VMware ESX Server, an overview of virtual machine servers is provided in order to facilitate understanding of the embodiments described below.

Figure 1A:
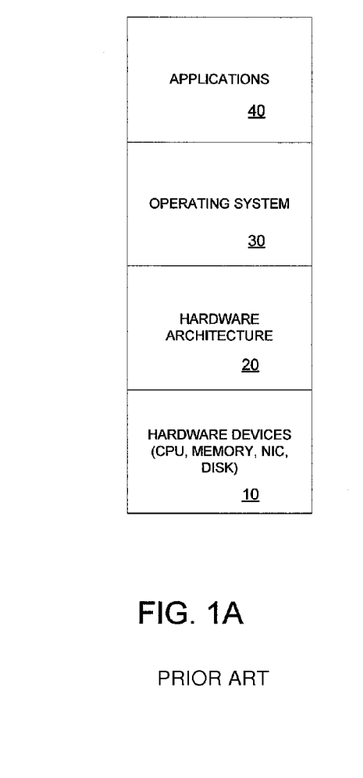
FIGS. 1A-1B illustrate a comparison between a traditional computer server architecture and the architecture of a server having a virtualization layer.
Figure 1B:
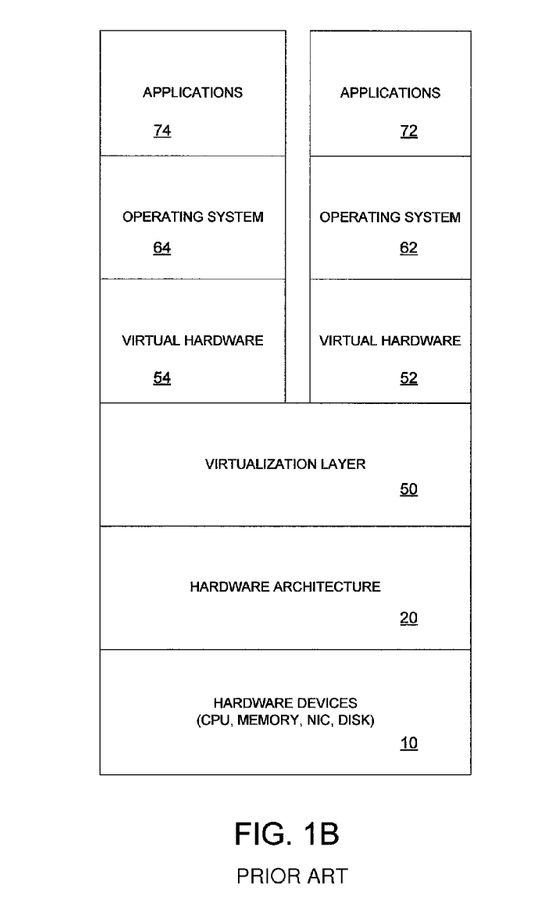

A comparison between the traditional server architecture and the virtualization layer server installed on a traditional server architecture is shown in FIGS. 1A-1B. Traditional server architecture shown in FIG. 1A includes hardware architecture 20 comprising physical hardware resources 10, including a central processor unit (CPU), memory, disk storage device, and network interface adapter in simplest form. The server has a resident operating system 30 and a plurality of applications 40 that execute on the operating system. FIG. 1B shows that virtualization layer software presents individual virtual hardware 52, 54 to each virtual machine. In this manner, the operating systems 62, 64 and applications 72, 74 installed in virtual machines are not aware that the hardware 52, 54 is virtual.

Figure 2:
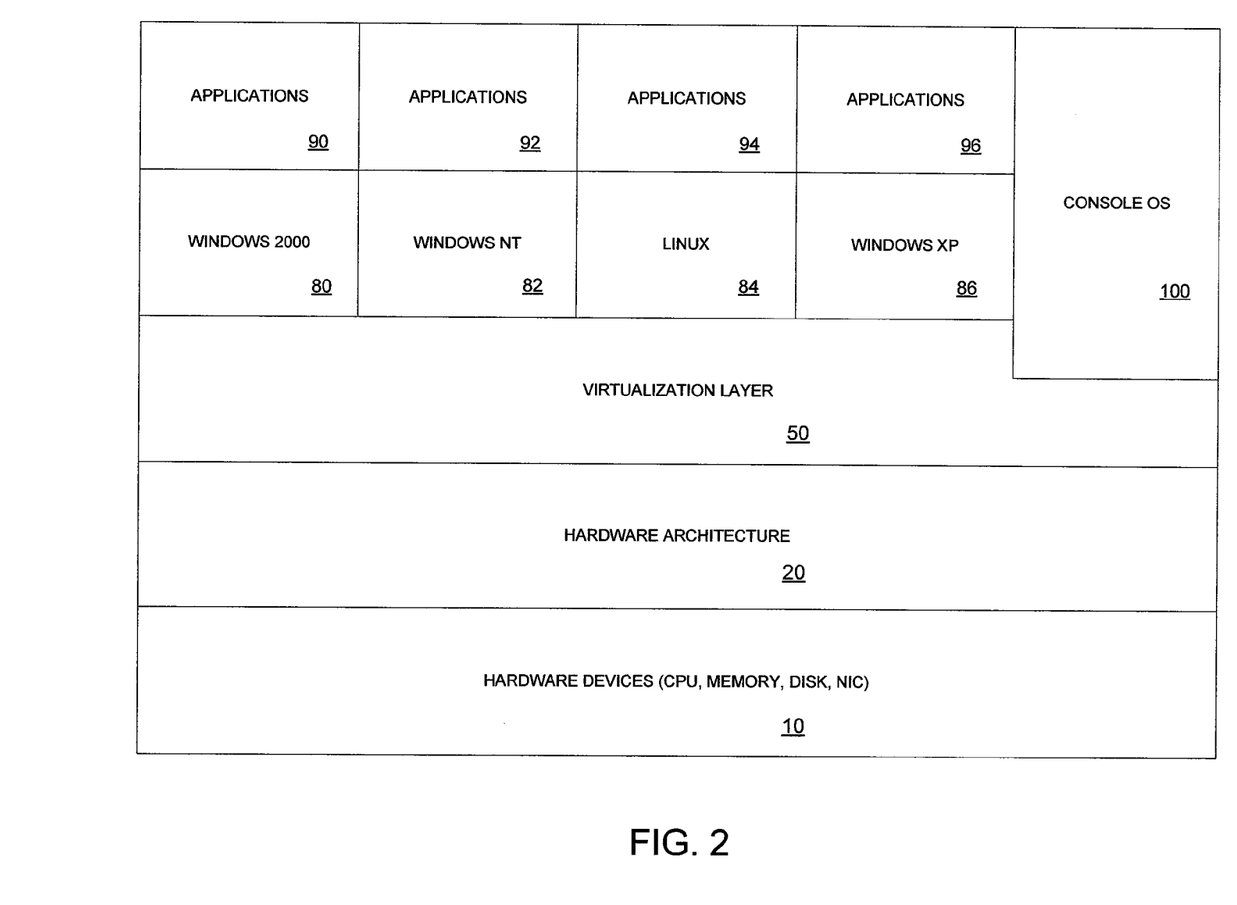
FIG. 2 illustrates the architecture of the virtualization server used in embodiments of the invention.

As illustrated in FIG. 2, the virtualization layer server core architecture implements abstractions that allow hardware resources 10 to be allocated to multiple workloads in fully isolated virtual environments. Virtualization server software incorporates a resource manager and a service console that provide management and other services. The resource manager enables the partitioning and guaranteed delivery of central processing unit (CPU), memory, network bandwidth and disk bandwidth to each virtual machine (VM). The hardware interface components, with device drivers, enable hardware-specific service delivery while hiding hardware differences from other parts of the system. The virtualization server software is capable of simultaneously hosting heterogeneous operating systems 80, 82, 84, 86 and applications 90, 92, 94, 96. The Console operating system (OS) 100 is provided as an interface to support the virtualization server kernel.

Figure 3A:
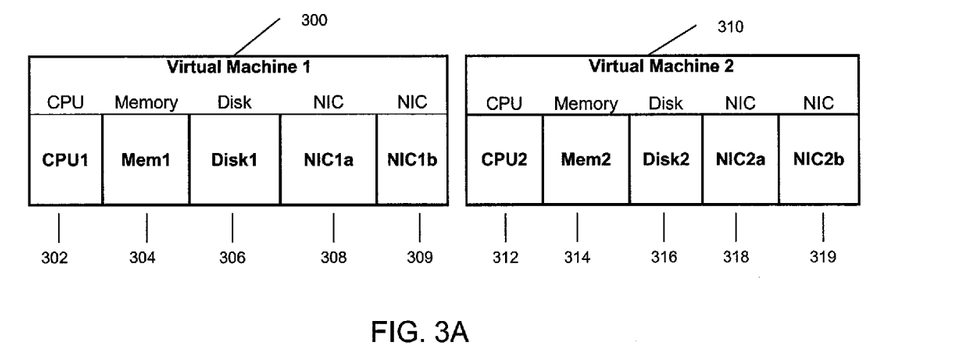
FIGS. 3A-3B illustrate virtualization of the hardware resources into virtual resources in a server having a virtualization layer.
Figure 3B:
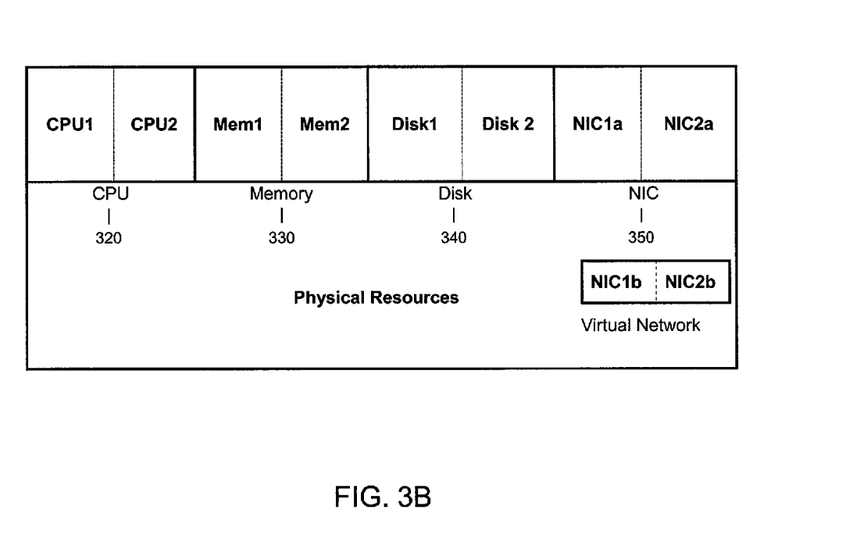

In FIG. 3A, both virtual machines 300, 310 are configured respectively with a virtual CPU 302, 312, a virtual memory 304, 314 and virtual disk allocation, and two virtual network adapters 308, 309 and 318, 319 (e.g., Ethernet). In actuality, the virtual machines 300, 310 share the same physical CPU 320 and access noncontiguous pages of memory 330. The virtual disks 306, 316 are files on a common file system. Each virtual disk 306, 316 has a network interface 308, 318 bound to and sharing a single physical network adapter 350 (i.e., network interface card (NIC)). The second network interface 309, 319 in each virtual machine 300, 310 is bound to a virtual network interface within the virtualization server system. FIG. 3B illustrates the mapping from virtual resources to physical resources.

The virtual machine offers complete hardware virtualization. The guest operating system and applications inside a virtual machine do not know which physical resources they are accessing, such as which CPU the virtual machine is running on in a multiprocessor system or which physical memory is mapped to the pages of the virtual machine. The virtualization of the CPU incorporates direct execution. The hardware CPU executes non-privileged instructions without the overhead introduced by emulation.

The virtualization layer provides an idealized physical machine that is isolated from other virtual machines on the system. The virtualization layer provides the virtual devices that map to shares of specific physical devices. These physical devices include at least one CPU, memory, I/O devices, buses, network interfaces, storage adapters and devices, human interface devices, basic input-output system (BIOS) and others.

Each virtual machine runs its own operating system and applications. They cannot talk to each other or leak data, other than through networking mechanisms similar to those used to connect separate physical machines. This isolation leads many users of virtualization software to build internal firewalls or other network isolation environments, allowing some virtual machines to connect to the outside while others are connected only to virtual networks through other virtual machines.

Each virtual machine appears to run on its own CPU, or set of CPUs, fully isolated from other virtual machines, with its own registers, translation look aside buffer, and other control structures. Most instructions are directly executed on the physical CPU, allowing compute-intensive workloads to run at near-native speed.

While a contiguous memory space is visible to each virtual machine, the physical memory allocated may not be contiguous. Instead, noncontiguous physical pages are remapped efficiently and presented to each virtual machine. Some of the physical memory of a virtual machine may in fact be mapped to shared pages, or to pages that are unmapped or swapped out. This virtual memory management is performed by the virtualization server without the knowledge of the guest operating system and without interfering with its memory management subsystem.

Support of disk devices in VMware ESX Server is an example of the product's hardware independence. Each virtual disk is presented as a Small Computer System Interface (SCSI) drive connected to a SCSI adapter. This device is the only disk storage controller used by the guest operating system, despite the wide variety of SCSI, Redundant Array of Independent Disks (RAID) and Fibre Channel adapters that could be used in the system.

In the virtualization server architecture, guest operating systems interact only with the standard Intel x86-compatible virtual hardware presented by the virtualization layer. This provides the capability for the virtualization server to support any x86-compatible operating system. In practice, however, the virtualization server supports a subset of x86-compatible operating systems that are tested throughout the product development cycle.

Because applications interact only with their guest operating system, and not the underlying virtual hardware, once operating system compatibility with the virtual hardware is established, application compatibility is not an issue. The service console can be a modified Linux operating system available from Red Hat which could be considered a privileged virtual machine with access to some hardware.

The virtualization server is a highly efficient hypervisor/kernel built for the sole purpose of managing virtual machines. The virtualization server uses the console operating system's 100 file system to store its kernel files, drivers, virtual machine configuration files, log files and suspend files.

System management functions and interfaces are implemented in the service console. These include the HyperText Transfer Protocol (HTTP), Simple Network Management Protocol (SNMP) and application programming interfaces (API), as well as other support functions such as authentication and low-performance device access. The service console is also installed as a first component and is used to bootstrap the ESX Server installation and configuration, as well as to boot the system and initiate execution of the virtualization layer and resource manager. In VMware ESX Server, the service console is implemented using a modified Linux distribution.

The process of applying software updates (patches) to an ESX Server is very complex. Updates to the ESX Server software require selective application of patches that are specific to the operating environment. VMware classifies software patches into security, critical, and general fixes. Security patches fix one or more potential security vulnerabilities in ESX Server. Critical patches fix flaws that can potentially cause data loss or severe service disruptions. General patches fix minor flaws potentially affecting a small number of users. General patches are optional and require evaluation by a system administrator before installation. The ESX Server patches are released in bundles on an as required basis. For example, the patches for ESX Server 3.0.1 released on Jan. 2, 2008 included five general patches and six security patches. Three of the general security patches required a virtual machine shutdown and a host reboot. Four of the security patches required a virtual machine shutdown and a host reboot. Several of the general and security patches superseded previous patches of the same types. Embodiments of the invention enable installation of software patches, regardless of type, without a host reboot.

In embodiments of the invention, patches are downloaded from the Internet to a Windows-based PC machine and copied to the Linux console of the virtualization server. The PC machine can be located remotely from the virtualization server. The patches are decompressed and then executed in relevant order (so as to not install older patches after newer ones). Most patches require a reboot with each installed patch. Embodiments of the invention include two script files that automate the copying of the files from the Windows-based PC where they were downloaded to the Linux console. The second script automates the decompression of all the files and then executes the decompressed files, daisy chained (i.e., linked in series), with only one reboot at the end. Embodiments of the invention save several hours on the build of a new server with multiple patches, and help with the release of scheduled patches in implementation. The scripts relieves the user from knowing Windows-to-Linux copy commands, and from knowing Linux commands to decompress and patch.

Embodiments of the invention utilize the plink.exe and pscp.exe executable programs that are included in the PuTTY software package available for download over the Internet. Plink provides a command-line connection tool. Pscp is a method to transfer files from a Windows command line prompt. PuTTY provides a client program for the Secure Shell (SSH), Telnet and Rlogin network protocols. These protocols are all used to run a remote session on a computer, over a network. PuTTY implements the client end of that session.

The specific process employed starts with the end user downloading the patch files from VMware's web page. The patch files are released in groups, all on the same date. Downloads should be placed in sequentially numbered directories. The user then executes the "CopyPatches.cmd" script. This script relies on the plink.exe and pscp.exe commands being in the same directory as the script file. These two executables provide Windows to Linux command execution and file copy. The "CopyPatches.cmd" script prompts for a remote server name, destination directory, and username for authentication. The script connects to the remote virtualization server, asks the user for the password, and begins to copy the files using the pscp.exe command. Once done copying the files, the script asks the user the password again to set permissions on the files using the plink.exe command.

A listing of the "CopyPatches.cmd" script follows:
REM Copies Patch Tree to Prompted Server
Echo Off
;
CLS
SETLOCAL
REM Set ERRORLEVEL=-1
set SRVNAME=
set PATCHDIR=patches35
:GetMachine
SET /P SRVNAME=Enter Server To Copy Patches To:
SET /P DESTPATH=Enter Datastore Path (after /vmfs/volumes/ ):
Echo.
Echo You Will Be Prompted for Admin Password To Create Patches Directory
PLINK admin@% SRVNAME % mkdir /vmfs/volumes/% DESTPATH %/% PATCHDIR %
:CopyThem
Echo.
Echo Ready To Copy Patches, You Will Need To Authenticate As Admin . . .
PSCP -r patches\*.* admin@% SRVNAME %:/vmfs/volumes/% DESTPATH %/% PATCHDIR %
Echo.
Echo Done Copying Patches ! !
Pause
Echo.
Echo Setting File Attributes . . .
Echo You Will Need To Authenticate As Admin Again . . .
PLINK admin@% SRVNAME % chmod 774 /vmfs/volumes/% DESTPATH %/% PATCHDIR %/patchme
Echo Done !!
Sleep 2

Next, the user connects to the virtualization console through any terminal method, but usually PuTTY, and executes the "PatchMe" script. This script walks through all of the patch files and decompresses them into subdirectories. It then walks the directory tree and executes all of the patch files with a no-reboot option. After all patch files are executed, this script prints directions on the screen for the user to reboot in order to complete the patching process.

A listing of the "PatchMe" script follows:

```
echo . >> /var/log/PatchLog.txt
echo . >> /var/log/PatchLog.txt
date >> /var/log/PatchLog.txt
echo . >> /var/log/UnTarMe.log
echo . >> /var/log/UnTarMe.log
date >> /var/log/UnTarMe.log
echo Starting UnTarMe Script . . . >> /var/log/UnTarMe.log
echo Starting UnTarMe Script . . .
echo .
echo Please Wait .. Making Sure All Packages Are Expanded . . .
echo .
echo Ignore errors about: ls: *.tgz: No such file or directory
echo.
echo Please Be Patient, This Takes A While . . .
sleep 1
for u in $( ls -d1 */ ); do
    pwd >> /var/log/UnTarMe.log
    cd $u
    pwd >> /var/log/UnTarMe.log
    for f in $( ls *.tgz ); do
        echo UnTarring $f >> /var/log/UnTarMe.log
        echo Uncompressing $f
        tar -xvzf $f >> /var/log/UnTarMe.log
        echo Deleting $f >> /var/log/UnTarMe.log
        rm -v $f >> /var/log/UnTarMe.log
    done
    cd ..
    pwd >> /var/log/UnTarMe.log
```

-continued

```
done
date >> /var/log/UnTarMe.log
echo Done With UnTarMe Script . . . Exiting!! >> /var/log/UnTarMe.log
echo .
echo Done With Expanding Patch Packages . . .
sleep 2
echo Starting PatchMe Script . . . >> /var/log/PatchLog.txt
echo .
echo Starting to Execute Patches . . .
sleep 2
for i in $( ls -d1 */ ); do
   pwd >> /var/log/PatchLog.txt
   cd $i
   pwd >> /var/log/PatchLog.txt
   for s in $( ls -d1 */ ); do
      cd $s
      pwd >> /var/log/PatchLog.txt
      /usr/sbin/esxupdate -n update >> /var/log/PatchLog.txt
      cd ..
      pwd >> /var/log/PatchLog.txt
   done
   cd ..
   pwd >> /var/log/PatchLog.txt
done
date >> /var/log/PatchLog.txt
echo Done With PatchMe Script . . . Exiting !!! >> /var/log/PatchLog.txt
echo .
echo Done Applying Patches ! ! !
echo .
echo If you wish to reboot, use: su -c '/sbin/shutdown -r now'
echo .
```

Figure 4:
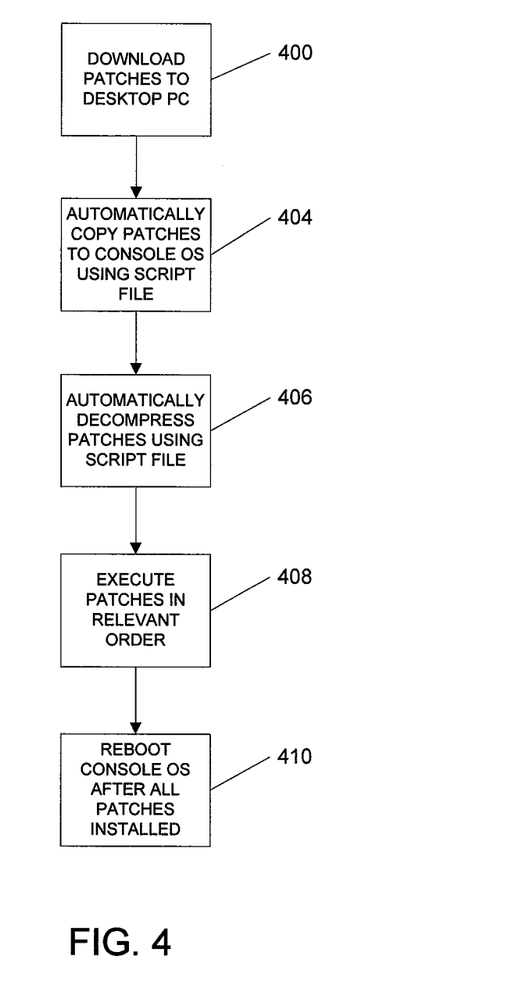
FIG. 4 illustrates the processing logic for automatic application of patch scripts to a servers having a virtualization layer in accordance with an exemplary embodiment of the invention.

FIG. 4 illustrates the processing logic for automatic application of patch scripts to a server having a virtualization layer. In step 400, the user downloads patches for the virtualization server to a desktop PC typically executing a Windows operating system. The downloaded patches are then copied automatically to the virtualization server console operating system automatically using a copy patches script file as indicated in step 404. A second script file decompresses the copied patches automatically as indicated in step 406. The patches are then executed on the virtualization server in relevant order in step 408. Relevant order refers to the appropriate sequencing of patches so that older patches are installed before newer patches. The console operating system is rebooted only after all software patches are installed as indicated in step 410.

The system and method of the present invention have been described as computer-implemented processes. It is important to note, however, that those skilled in the art will appreciate that the mechanisms of the present invention are capable of being distributed as a program product in a variety of forms, and that the present invention applies regardless of the particular type of physical signal bearing media utilized to carry out the distribution. Examples of signal bearing media include, without limitation, recordable-type media such as diskettes or CD ROMs.

The corresponding structures, materials, acts, and equivalents of any means plus function elements in the claims below are intended to include any structure, material, or acts for performing the function in combination with other claim elements as specifically claimed. Those skilled in the art will appreciate that many modifications to the exemplary embodiments are possible without departing from the scope of the present invention.

In addition, it is possible to use some of the features of the exemplary embodiments without the corresponding use of the other features. Accordingly, the foregoing description of the exemplary embodiments is provided for the purpose of illustrating the principles of the invention, and not in limitation thereof, since the scope of the invention is defined solely by the appended claims.

What is claimed is:

1. A method for automating application of software patches during a build of a server system having a virtualization layer, comprising the steps of:
   a computer system having a first operating system downloading a plurality of software patches;
   the computer system determining the software patches to apply in conjunction with a build of a new server console operating system;
   the computer system indicating, during the build, a destination directory of the server system for software patch placement in response to executing a first script file wherein execution by the computer system of the first script file includes the computer system prompting a user of the computer system for a username and password and locally authenticating the user name and password;
   the computer system, during the build, copying the software patches in compressed format to the destination directory; and
   the computer system, during the build, decompressing and installing the software patches to the destination directory and rebooting the console operating system in response to executing a second script file wherein execution of the second script file causes installation using a remote terminal session;
   wherein the virtualization layer partitions the server into a plurality of virtual machines, each including a guest operating system and virtual hardware, with the virtual hardware mapping to an underlying physical hardware of the server.

2. The method for automating application of software patches, during the build, to the server system of claim 1 wherein the guest operating systems corresponding to the virtual machines are heterogeneous.

3. The method for automating application of software patches, during the build, to the server system of claim 1 wherein the downloaded software patches are stored in sequentially numbered directories on the computer system.

4. The method for automating application of software patches, during the build, to the server system of claim 1 wherein the first script file provides command execution and file copying of the software patches stored in sequentially numbered directories from the computer system to the server console.

5. The method for automating application, during the build, of software patches to the server system of claim 1 wherein the decompressed patches are installed to the server console operating system with a no reboot option.

6. The method for automating application of software patches, during the build, to the server system of claim 1 further comprising linking the decompressed software patches for serial installation.

7. The method for automating application of software patches, during the build, to the server system of claim 1 wherein the first operating system is a Windows-based platform.

8. The method for automating application of software patches, during the build, to the server system of claim 1 wherein the console operating system is a Linux-based platform.

9. The method for automating application of software patches, during the build, to the server system of claim 1 wherein the computer system is located remotely from the server system.

10. A system for automating application of software patches during a build of a server having a virtualization layer, comprising:
- a plurality of data stores for storing software patches;
- a processor for executing a plurality of components including:
- a component for downloading a plurality of software patches to a computer system having a first operating system;
- a component for indicating a destination directory of a new server system build for software patch placement in response to executing a first script file wherein execution by the computer system of the first script file includes the computer system prompting a user of the computer system for a username and password and locally authenticating the user name and password;
- a component for copying the software patches in compressed format to the destination directory; and
- a component for decompressing and installing the software patches into the destination directory and rebooting a console operating system in response to executing a second script file wherein execution of the second script file causes installation using a remote terminal session;
- wherein the virtualization layer partitions the server into a plurality of virtual machines, each including a guest operating system and virtual hardware, with the virtual hardware mapping to an underlying physical hardware of the server.

11. The system for automating application of software patches of claim 10 wherein the guest operating systems corresponding to the virtual machines are heterogeneous.

12. The system for automating application of software patches of claim 10 wherein the component for downloading stores software patches in sequentially numbered directories.

13. The system for automating application of software patches of claim 10 wherein the component for automatically copying provides command execution and file copying of the software patches stored in sequentially numbered directories from the computer system to a server console.

14. The system for automating application of software patches of claim 10 wherein the component for installing installs the decompressed patches to a server console operating system with a no reboot option.

15. The system for automating application of software patches of claim 10 further comprising a component for linking the decompressed software patches for serial installation to a server console operating system.

16. The system for automating application of software patches of claim 10 wherein the first operating system is a Windows-based platform.

17. The system for automating application of software patches of claim 10 wherein the console operating system is a Linux-based platform.

18. A computer program product for automating application of software patches during build of a server system having a virtualization layer when operated on a processor, the program product comprising a non-transitory computer readable medium having computer readable code embedded therein, the computer readable medium comprising:
- program instructions that download a plurality of software patches to a computer system having a first operating system;
- program instructions that indicate, during the build, a destination directory of the server system for software patch placement in response to executing a first script file wherein execution by the computer system of the first script file includes the computer system prompting a user of the computer system for a username and password and locally authenticating the user name and password;
- program instructions that copy the software patches in compressed format to the destination; and
- program instructions that decompress and install the software patches into the destination directory and reboot a console operating system in response to executing a second script file wherein execution of the second script file causes installation using a remote terminal session;
- wherein the virtualization layer partitions the server into a plurality of virtual machines, each including a guest operating system and virtual hardware, with the virtual hardware mapping to an underlying physical hardware of the server.

19. The computer program product comprising a non-transitory computer readable medium for automating application of software patches, during the build, to the server system of claim 18 wherein the guest operating systems corresponding to the virtual machines are heterogeneous.

20. The computer program product comprising a non-transitory computer readable medium for automating application of software patches, during the build, to the server system of claim 18 wherein the program instructions that download software patches store the software patches in sequentially numbered directories on the computer system.

21. The computer program product comprising a non-transitory computer readable medium for automating application of software patches, during the build, to the server system of claim 18 wherein the program instructions that automatically copy the software patches to the server system include program instructions that copy the software patches stored in sequentially numbered directories from the computer system to a server console.

22. The computer program product comprising a non-transitory computer readable medium for automating application of software patches, during the build, to the server system of claim 18 wherein the program instructions that install the decompressed patches to a server console operating system include a no reboot option.

23. The computer program product comprising a non-transitory computer readable medium for automating application of software patches, during the build, to the server system of claim 18 further comprising program instructions that link the decompressed software patches for serial installation.

* * * * *